United States Patent

Marino

[11] 4,194,223
[45] Mar. 18, 1980

[54] MAGNETIC RECORDING DETECTION

[75] Inventor: Francis C. Marino, Dix Hills, N.Y.

[73] Assignee: Redactron Corporation, Yaphank, N.Y.

[21] Appl. No.: 943,050

[22] Filed: Sep. 18, 1978

[51] Int. Cl.² .............................................. G11B 5/09
[52] U.S. Cl. ................................................... 360/41
[58] Field of Search ............................. 360/41, 67, 40

[56] References Cited

U.S. PATENT DOCUMENTS

| | | | |
|---|---|---|---|
| 3,413,625 | 11/1968 | Mitterer et al. | 360/40 |
| 3,478,255 | 11/1969 | Parker et al. | 360/40 |
| 3,715,738 | 2/1973 | Kleist et al. | 360/40 |
| 3,719,934 | 3/1973 | Behr et al. | 360/41 |
| 3,735,372 | 5/1973 | Coccagna | 360/40 |
| 3,852,809 | 12/1974 | Coker, Jr. | 360/40 |
| 3,947,876 | 3/1976 | Gray | 360/41 |
| 4,087,840 | 5/1978 | Zdrojkowski et al. | 360/41 |

*Primary Examiner*—Vincent P. Canney
*Attorney, Agent, or Firm*—Hane, Roberts, Spiecens & Cohen

[57] ABSTRACT

In a magnetic recording system utilizing a non-return-to-zero format the reproduced recording is fed to positive and negative threshold detectors having no need for electrical hysteresis as well as, via differentiator means, to a zero-crossing detector. The signal from the positive threshold detector and one polarity of the signal from the zero-crossing detector are used to trigger a latch means to a first state to emit a signal having a first level, and the signal from the negative threshold detector and the other polarity of the signal from the zero-crossing detector are used to trigger the latch means to a second state whereby the signal emitted by the latch means is switched to a second level.

7 Claims, 2 Drawing Figures

MAGNETIC RECORDING DETECTION

BACKGROUND OF THE INVENTION

This invention pertains to magnetic recording and more particularly to the reproduction of non-return-to-zero magnetic recordings.

In a magnetic recording system having a high storage density such as a rotating floppy disc, the signal read out from the tracks is generally asynchronous with respect to a fixed clock because expansions, etc. of the surface due to temperature changes, mechanical effects, etc. Therefore, self clocking systems are employed. Of these self clocking systems the non-return-to-zero (NRZ) schemes are used because of their high packing densities. Typically, the methods used includes some combination of linear amplification, differentiation, zero-crossing and/or threshold detection. Variations of these combinations are shown in the following U.S. Pat. Nos. 3,164,815; 3,404,391; 3,413,625; 3,503,059; 3,719,934; 3,838,448; 3,840,892; 3,865,981; 3,909,518; and 3,947,876. (Of these patents U.S. Pat. No. 3,413,625 to Mitterer et al. is considered closest to the present invention). While many of the proposed solutions are adequate in many circumstances, they do not solve the problem known as the "shouldering effect". This occurs when the primary signal is differentiated and produces what is commonly referred to as the "droop" problem. This problem is more acute in disc technology due to the wide variation in flux densities resulting from a single frequency recording on the circular tracks with varying radial distances from the center of a disc rotating at a constant angular velocity.

More specifically the shouldering effect occurs with high resolution reproducing transducers when the time between peaks exceeds a given interval. In that case, there is a "knee" in the form of third harmonic distortion in the reproduced waveform. When this knee is differentiated it produces a droop in the differentiated signal which if it reaches a certain value causes a spurious pulse.

SUMMARY OF THE INVENTION

Briefly, the invention contemplates negative and positive threshold detecting without hysteresis as well as differentiating the reproduced signals of a non-return-to-zero signal recorded on a magnetic medium. The reproduced signals after differentiation are zero-crossing detected to yield a zero-crossing signal. Coincidence detecting one polarity of the zero-crossing signal with the signal resulting from the positive threshold detection switches an output signal to a first signal level; and coincidence detecting the other polarity of the zero-crossing signal with the signal resulting from the negative threshold detection switches the output signal to a second signal level.

BRIEF DESCRIPTION OF THE DRAWING

Other objects, the features and advantages of the invention will be apparent from the following detailed description when read with the accompanying drawing which shows the presently preferred embodiment of the invention. In the drawing.

DESCRIPTION OF THE PREFERRED EMBODIMENT

Figure 1:
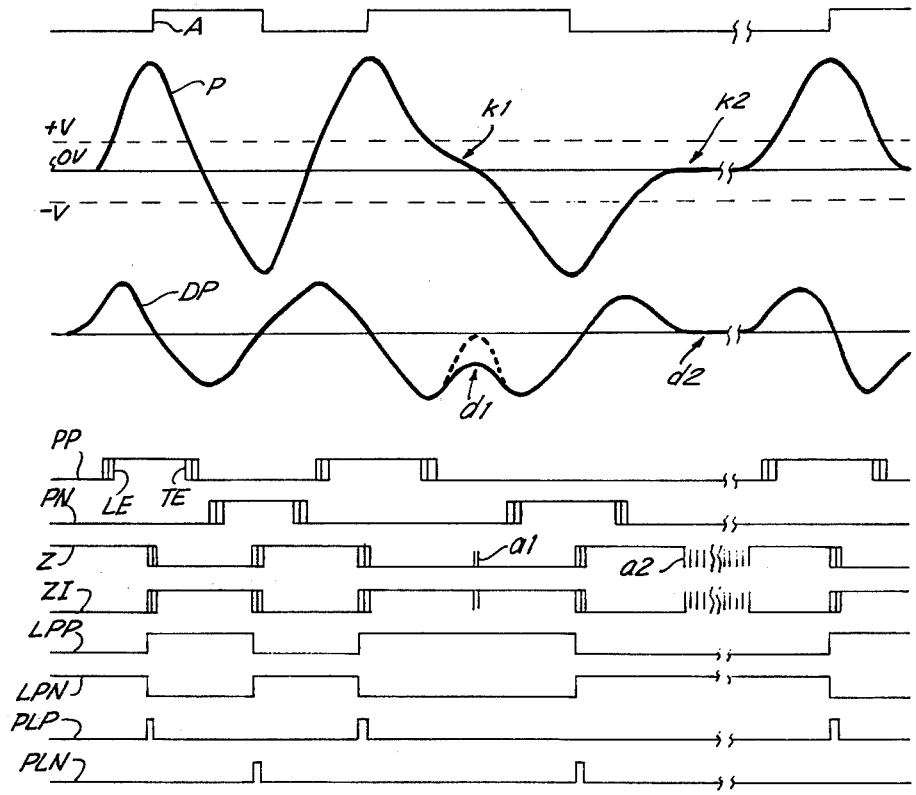
FIG. 1 shows waveforms useful in understanding the invention.
Figure 2:
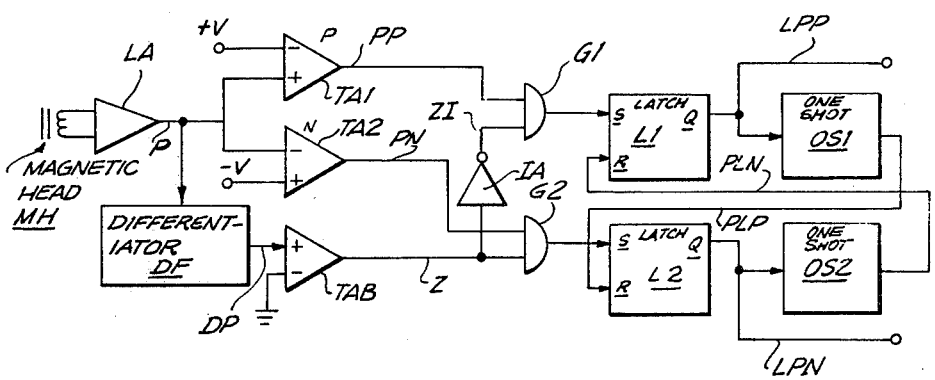
FIG. 2 is a block diagram of apparatus for realizing the invention.

In FIG. 1 waveform A shows the input recording current to the recording portion of a magnetic transducer or head in accordance with a NRZ format while waveform P shows the signal generated by the magnetic head MH when "reading" the recording produced by the current waveform A. The knee k1 and the much greater knee k2 are present because of the increased spacing between the level transitions of waveform A. Waveform DP is waveform P after differentiation. It is seen that the knee k1 results in the droop region d1. If this region reaches the zero level a spurious pulse can be generated. The problem is even more pronounced in region d2. In order to remove these ambiguities, the apparatus of FIG. 2 processes the reproduced waveform.

In particular, the reproducing portion of magnetic head MH is connected to a linear amplifier LA. The output of the linear amplifier LA emits a signal of waveform P to positive threshold amplifier TA1, negative threshold amplifier TA2 and differentiator DF. The positive threshold amplifier TA1 can be a conventional comparator or difference amplifier without hysteresis whose positive input (+) is connected to the output of amplifier LA to receive the signal having waveform P. The negative input (−) to the amplifier TA1 is connected to source of threshold voltage +V. The amplifier is in a sense "bistable", i.e., it is normally "off" until the voltage at the positive input (+) exceeds the threshold level +V at which time it switches "on" and stays on until such level drops below the threshold level +V when it switches to the off state. See waveforms P and PP of FIG. 1. Note the multiline leading and trailing edges such as LE and TE of the transitions of waveform PP are present to indicate "jitter", ambiguities, or instabilities at these transitions because hysteresis has been deliberately omitted. It should be noted that the signal having waveform PP is unstable at those transitions where the level of waveform P is equal to the threshold level +V, but is stable everywhere else.

Similarly and in a complementary manner negative threshold amplifier TA2 receives the signal having waveform P at its negative input (−) and receives the threshold voltage-V at its positive input (+) to yield at its output the signal having waveform PN.

The differentiator DF can be a conventional RC-type differentiator or operational amplifier which when it receives the signal having waveform P at its input connected to the output of amplifier LA yields the signal having waveform DP swinging around a constant DC level preferably chosen to be ground.

The output of differentiator DF is fed to the positive (+) input of threshold amplifier TA3 whose negative input (−) is ground. In this configuration the threshold amplifier TA3 which can be similar to the threshold amplifier TA1 acts as a zero-crossing detector in that it is "off" as long as the level of the signal having waveform DP is below ground or zero volts and switches "on" as the signal passes from a negative level through zero volts to a positive level. The amplifier once "on" switches "off" as the signal passes from a positive level through zero volts to a negative level. Compare waveforms DP and Z (the output of amplifier TA3) in FIG. 1. Thus the transitions or edges of the waveform Z occur at the zero crossings of the waveform DP with the directions or polarities of the transitions following the directions of zero crossings. The output of the amplifier TA3 is fed to inverting amplifier IA to give the signal having waveform ZI in FIG. 1. Note again that the multilines at the leading and trailing edges of waveforms Z and ZI indicate that the signals are unstable whenever the derivative signal (waveform DP) is at or near zero volts since hysteresis is intentionally omitted here also. This becomes a problem whenever the waveform P undergoes "shouldering" or, more precisely, has inflections approaching or equal to "zero slope". See the instabilities a1 and a2 of waveform Z. These instabilities would ordinarily lead to spurious output pulses. However, the invention relies on the fact that, except for these unstable regions near the zero crossings, waveform Z is stable and that except for the threshold regions waveforms PP and PN are stable.

The invention utilizes this fact to control the timing of the transitions in a latch means. In general the latch means which is a bistable device preferably comprises the conventional latches L1 and L2 and conventional one shot pulse generators OS1 and OS2. The input S of either latch L1 or L2 can be considered the set input of the latch means; the input R of either latch L1 or L2 can be considered the reset input of the latch means; and the output Q of either latch L1 or latch L2 can be considered the output of the latch means.

The latch means is switched "on" to a first stable state upon receipt of the leading edge of a signal from coincidence detector G1 which can be a conventional AND-circuit whose output is connected to input S of latch L1 and whose two inputs are respectively connected to the outputs of amplifiers TA1 and IA respectively. Compare waveform LPP with waveforms ZI and PP. The latch means is switched "off" (to its other stable state) upon receipt of the leading edge of a signal from coincidence detector G2 which can be a conventional AND-circuit whose output is connected to input S of latch L2 and whose two inputs are respectively connected to outputs of amplifiers TA2 and TA2 respectively. Compare waveform LPP with waveforms Z and PN. Thus, at a negative transition of waveform Z (positive transition of waveform ZI) during the presence of the signal having waveform PP the output signal from the latch (waveform LLP) switches high (a positive transition) and remains high until there is a positive transition of waveform Z during the presence of a signal having waveform PN, at which time waveform LPP switches low (a negative transition). Note the correspondence of input waveform A and output waveform LPP. Note also that in spite of the transition waveform Z at region a1 there is no spurious low switching of output waveform LPP because at that time waveform PP is low. A complementary analysis holds for region a2.

In order to enhance the reliability of the latching operation, it is preferred instead of using a single latch to cross connect the output Q of latch L1 via one shot pulse generator OS1 to the reset input R of latch L2, and the output Q of latch L2 via one shot pulse generator OS2 to the reset input R of latch L1. Thus when latch L1 is set the positive going output signal triggers pulse generator OS1 to emit a pulse which resets latch L2; and when latch L2 is set its positive going output signal triggers pulse generator OS2 to emit a pulse which resets latch L1.

There has thus been shown an improved magnetic recording recovery circuit that is droop insensitive independent of the recorded density for NRZ recording formats up to that density resolvable by the reproducing head and amplifier designs.

While only one embodiment of the invention has been shown and described in detail, there will now be obvious to those skilled in the art many modifications and variations satisfying many or all of the objects of the invention without departing from the spirit thereof as defined by the appended claims.

What is claimed is:

1. In a magnetic recording system wherein information is recorded according to one of the non-return-to-zero formats, apparatus for evaluating signals reproduced by a magnetic transducer comprising: a positive threshold detector means for giving a first threshold signal as long as a received signal is greater than a first given voltage level; a negative threshold detector means for giving a second threshold signal as long as a received signal is less than a second given voltage level; signal differentiator means for generating a derivative signal whose waveform is the time derivative of a received signal; means for connecting the magnetic transducer to each of said threshold detector means and said differentiator means; zero-crossing detector means for giving a zero-crossing signal whenever the amplitude of the derivative signal passes through a predetermined voltage level, the polarity of the zero-crossing signal being determined by the direction of the passage of the derivative signal through the predetermined voltage level; and bistable means connected to said zero-crossing detector means and said threshold detector means for giving a signal which switches from a first signal level to a second signal level at the coincidence of a zero-crossing signal of a first polarity and one of the threshold signals, and which switches from the second signal level to the first signal level at the coincidence of a zero-crossing signal of a second polarity and the other of the threshold signals, said bistable means comprising latching means having a first input which upon receipt of a signal triggers the latching means to a first state and a second input which upon receipt of a signal triggers the latching means to a second state, a first coincidence means having inputs connected to one of said threshold detector means and said zero-crossing detector means and an output connected to the first input of said latching means, and a second coincidence means having inputs connected to the other of said threshold detector means and said zero-crossing detector means and an output connected to the second input of said latching means.

2. The apparatus of claim 1 wherein said connecting means comprises a linear amplifier.

3. The apparatus of claim 1 wherein said latching means comprises: a first latch having a set input, a reset input and an output, the set input of said first latch being connected to the output of one of said coincidence means; a second latch having a set input, a reset input and an output, the set input of said second latch being connected to the output of the other of said coincidence means; first cross-connecting means for connecting the output of said first latch to the reset input of said second latch; and second cross-connecting means for connecting the output of said second latch to the reset input of said first latch; and the output of one of said latches being the output of said bistable means.

4. The apparatus of claim 3 wherein said cross-connecting means comprises pulse forming means.

5. The apparatus of claim 3 wherein said zero-crossing detecting means has a direct output connected to one of the inputs of one of said coincidence means, and an inverting output connected to one of the inputs of the other of said coincidence means.

6. The apparatus of claim 5 wherein said connecting means comprises a linear amplifier.

7. The apparatus of claim 6 wherein said zero-crossing detecting means has a direct output connected to one of the inputs of one of said coincidence means, and an inverting output connected to one of the inputs of the other of said coincidence means.

* * * * *